UNITED STATES PATENT OFFICE.

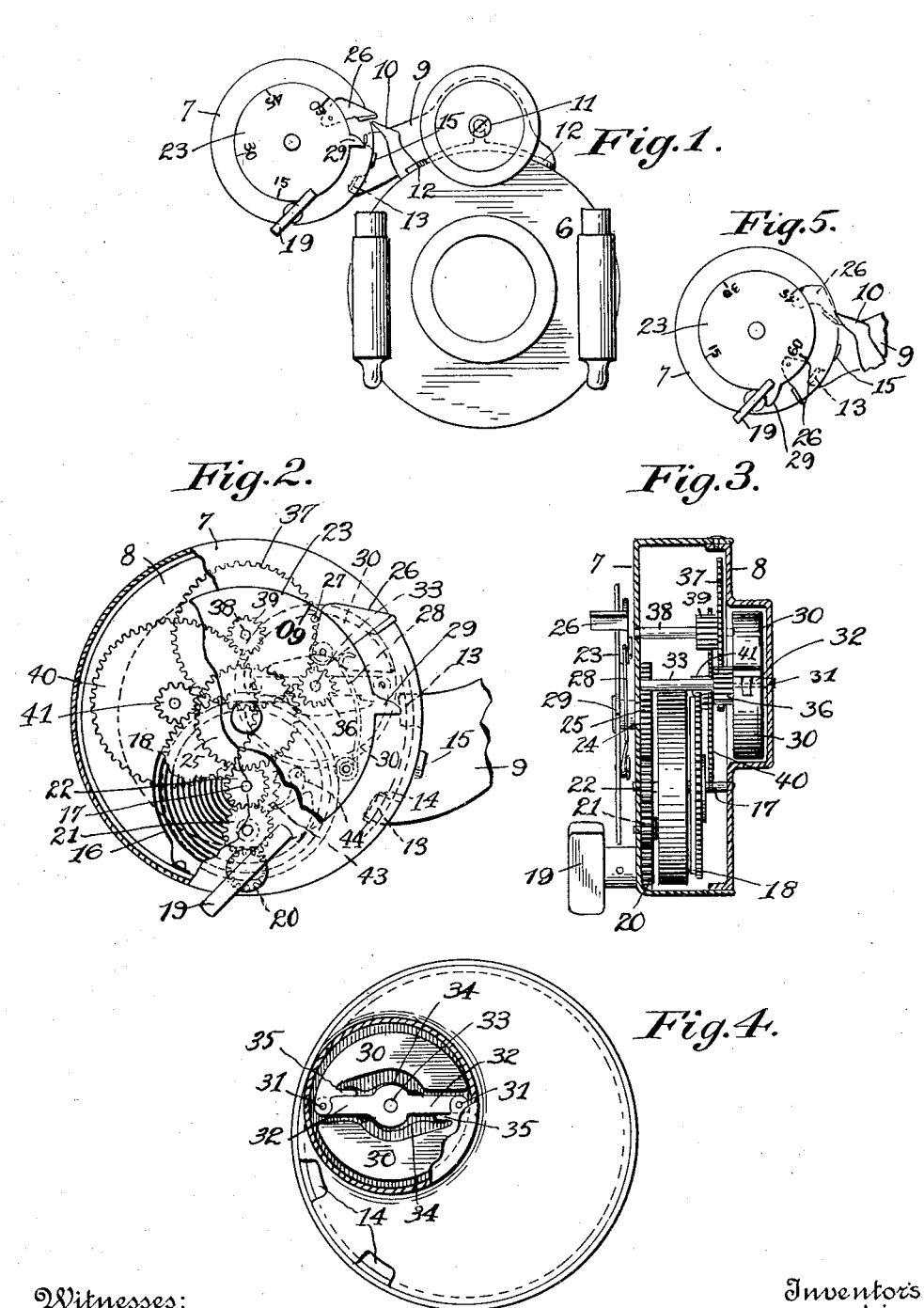

ALFRED G. F. KUROWSKI AND OTTO A. MARTINI, OF NEW YORK, N. Y.

TIME-CONTROLLED CAMERA-SHUTTER OPERATOR.

1,151,196.  Specification of Letters Patent.  Patented Aug. 24, 1915.

Application filed January 9, 1913. Serial No. 740,997.

*To all whom it may concern:*

Be it known that we, ALFRED G. F. KUROWSKI, a subject of the German Emperor, and OTTO A. MARTINI, a subject of the King of Denmark, both residing in the borough of Brooklyn, in the county of Kings, city and State of New York, have invented a new and useful Time-Controlled Camera-Shutter Operator, of which the following is a specification.

This invention relates to time controlled mechanism to mechanically actuate the shutter of a camera within a predetermined space of time to thereby enable a person to take his own picture, or to form one of a group of persons of which it is desired to take a picture, and it is the object of the invention to provide a device of this character which is cheap and simple in construction and efficient in operation.

With this object in view we provide a rotatable disk carrying a pawl, whereby the latter has a circular orbit of movement and is adapted to engage with and operate the camera shutter actuating lever, the disk preferably being graduated to indicate the lapse of time between the setting of the device and the actuation of the camera and shutter. Rotative movement is imparted to the disk and pawl by a spring and suitable means provided to wind the spring which means simultaneously with the winding of the spring also sets or adjusts the disk to the desired position. The movement of the disk and pawl is regulated by a centrifugal governor also actuated by the spring. The operative mechanism is carried within a casing and whereby the device is adapted to be connected to a camera.

In the drawing accompanying and forming a part of this specification, Figure 1 is a front elevational view illustrating our improved device applied to a camera, and showing the disk in position with the pawl about to engage with the camera shutter actuating lever. Fig. 2 is an enlarged front elevation with the casing and disk partly broken away to illustrate the mechanism interior of the casing. Fig. 3 is an enlarged sectional side elevation. Fig. 4 is an enlarged rear elevation with the casing partly broken away to illustrate the regulating governor; and Fig. 5 is a front elevation illustrating the disk in normal idle position, and in dotted lines showing the pawl passing the camera shutter actuating lever when the disk is rotated in anti-clockwise direction.

Similar characters of reference designate like parts throughout the different views of the drawing.

In the drawings we have shown only so much of a camera 6 as is essential to the understanding of the invention, said camera having the usual operating levers only one of which 10 is shown, and which is adapted to be operated by an air bulb or otherwise for time and instantaneous exposures.

In the embodiment of the invention illustrated in the drawing, the operative mechanism is inclosed in a casing comprising a pair of connected sections 7, 8, adapted to be detachably connected to the camera by a bracket 9. In the present instance this bracket is connected to the camera by a screw, as 11, and has a portion of circular formation to conform to the shutter housing and lens mounting with nibs 12 to rest thereon to firmly support the bracket. The other end of the bracket to which the device is connected is provided with a pair of forwardly extending nibs 13 to engage in openings 14 in the casing section 8, and preferably lie contiguous to the inner surface of the lateral wall of the casing, a nib 15 stamped out and projecting forward from the bracket being adapted to lie contiguous to the outer face of the casing. In order to place the device in position and remove it from the support it is only necessary to slide the casing on and off the nibs 13, 15. Of course it will be understood that brackets of different formation may be utilized to adapt the device to cameras of different construction.

The mechanism is actuated by a spring 16 one end of which is connected to a shaft 17 journaled at its ends in the casing sections, the other end of the spring being fixed to the casing. A gear 18 is mounted to rotate on and with the shaft 17 for a purpose to be hereinafter described. The spring is wound by a finger key 19 the stem of which is rotatably mounted in the casing and has fixed on its inner end within the casing a pinion 20 meshing with an idle pinion 21, and which latter pinion meshes with a pinion 22 fixed to shaft 17. Simultaneously with the winding of the spring a disk 23 exterior of the casing fixed to a stud 24 rotatably mounted in the casing is rotated in anti-clockwise direction by a pinion 25 fixed to the stud 24 meshing with the pinion 22. As the finger key is released the spring will cause the disk to rotate in clockwise direction, a lip on a pawl 26 pivotally connected to said disk and traveling with the disk in a circular orbit of movement engaging with and operating the camera shutter actuating lever 10. This pawl is normally maintained in position against a stop 27 by a spring 28. It will be noted that when in normal position the pawl will project into the path of the lever 10, and as the disk is rotated anti-clockwise and the pawl engages with the lever 10 it will be swung on its pivot against the tension of the spring 28 thus permitting the free rotation of the disk. The disk is maintained in idle position against the action of the spring 16 by a stop 29 engaging with the stem of the key 19, as clearly shown in Fig. 5.

The movement of the pawl carrying disk is controlled by a centrifugal governor connected through a train of gearing with the gear 18 and shaft 17. This governor consists of a pair of segmental weights 30, 30, pivotally carried, as at 31, to the ends of laterally projecting arms 32 fixed to a shaft 33. These weights are disposed at each side of the arms 32 and project toward the arm opposite to which they are connected and caused to normally lie contiguous to the arms by springs 34 fixed at one end to the arms with their free ends egaging with projections 35 on the weights. The governor, as above stated, is connected to the gear 18 and shaft 17 through a train of gearing, consisting of a pinion 36 on shaft 33 meshing with a gear 37 on shaft 38, a pinion 39 on said latter shaft meshing with gear 40 to which is connected a pinion 41 which latter pinion meshes with the gear 18.

It is essential that when the spring is wound up there will be no rotative movement imparted to the gear 18, and for this purpose the gear is mounted to rotate on the shaft 17. However, in order to impart movement to the governor it is necessary to impart rotative movement to the gear and for this purpose we provide means to connect the gear to said shaft to rotate therewith, consisting of a ratchet wheel 43 fixed to the shaft adjacent to and within a recessed portion of the gear 18, and a pair of diametrically opposite spring influenced pawls pivotally carried by the gear within the recessed portion adapted to engage with said ratchet. As the spring is wound it will have a tendency to also rotate the gear but this will be overcome by the train of gearing connecting the governor to the gear and the weight of the governor itself, the pawls 44 riding over the teeth of the ratchet wheel 43. However, as the shaft 17 is rotated in reverse direction by the spring the pawls will engage with the ratchet teeth connecting and rotating the gear with the shaft 17 and through the gear actuating the governor. As the rotation of the gear exceeds a predetermined velocity the rotation of the governor weights will be increased and thereby the weights thrown outward on their pivots through the action of centrifugal force against the tension of the springs 34 and retard the rotation thereof and thereby the rotation of the gear and therethrough the disk 23. It will be noted that the governor is located in a circular recessed portion of the casing section 8 and should the governor attain a very high velocity the weights will be caused to frictionally engage with the circular walls of said recess retarding the rotation thereof.

The gearing of the device may be so constructed as to actuate the disk and cause the pawl to operate the camera shutter within any desired space of time. However, the present device is designed to actuate the camera shutter at any time within one minute. The disk 23 is graduated to indicate the division of one minute into seconds, and in the present instance is shown as divided into four divisions of 15 seconds each. As stated, the normal position of the disk is shown at Fig. 5 with the stop 29 engaging with the stem of the key 19. Should it be desired to set the device to actuate the cam shutter after the lapse of 15 seconds the disk is adjusted by rotating the key 19 until the division indicated by the division 15 registers with the stem of the key and upon the release of the key the pawl 26 will actuate the lever 10 when 15 seconds has elasped giving the operator ample time to assume the desired position before the shutter is actuated.

While the present device is designed to be detachably connected to a camera, it is obvious that it may be constructed as an integral part of a camera to constitute a permanent fixture thereof.

Variations may be resorted to within the scope of our invention.

We claim:

1. In a camera shutter operator, the combination of a casing having means to removably connect it to a camera; a spring inclosed by the casing; a rotatable graduated disk outside of the casing actuated by the spring; a finger-key; gearing to connect the finger-key with the spring to wind the spring and simultaneously adjust said disk in anti-clockwise direction, said disk being rotated in clockwise direction by the spring when the key is released; and a pawl pivotally carried by the disk, said pawl when the disk is adjusted in anti-clockwise direction being swung on its pivot and passing the shutter lever without imparting movement thereto and when the disk is rotated in clockwise direction by the spring engaging with and actuating the shutter lever.

2. In a camera shutter operator, the combination of a casing having means to removably connect it to a camera; a spring inclosed by the casing; a rotatable disk outside of the casing actuated by the spring; a finger-key; gearing to connect the finger-key with the spring to wind said spring and simultaneously adjust said disk in anti-clockwise direction, said disk being rotated in clockwise direction by the spring when the winding key is released; a pawl pivotally carried by the disk adapted to engage with and actuate the shutter lever of a camera when the disk is rotated in clockwise direction; a stop on the disk to engage with the winding key to limit the movement of the disk; and a governor within the casing actuated by the spring to regulate the movement of the disk and pawl in clockwise direction.

3. In a camera shutter operator, the combination of a casing having means to removably connect it to and support it from a camera; a spring inclosed by the casing; a rotatable disk outside of the casing actuated by the spring; a rotatable finger-key; gearing to connect the finger-key with the spring to wind the spring and simultaneously adjust the disk in anti-clockwise direction; a pawl carried by the disk; a stop pin in the disk; a spring to cause said pawl normally to abut against the pin, whereby as the disk is rotated in anti-clockwise direction the pawl is adapted to engage with the actuating lever of a camera and be swung on its pivot and pass said shutter lever and when the disk is rotated in clockwise direction by the spring it will abut against the stop and actuate said lever as it engages therewith; and a stop on the disk to engage with the finger key to limit the movement of the disk in clockwise direction.

4. In a camera shutter operator, the combination of a casing having means to removably connect it to and support it from a camera; a shaft rotatable in the casing; a spring inclosed by the casing to rotate the shaft; a pawl; a carrier for the pawl connected to the shaft outside the casing; a finger-key; and gearing to connect the finger-key to the shaft to wind the spring and simultaneously adjust the pawl carrier in anti-clockwise direction; said carrier when the finger key is released being rotated in clockwise direction by the spring; and said pawl so connected to the carrier that when the latter is rotated in anti-clockwise direction the pawl will pass the shutter lever without imparting movement thereto and when rotated in clockwise direction will engage with and actuate said lever.

ALFRED G. F. KUROWSKI.
OTTO A. MARTINI.

Witnesses:
JOHN O. SEIFERT,
LAURA E. SMITH.

Copies of this patent may be obtained for five cents each, by addressing the "Commissioner of Patents, Washington, D. C."